No. 875,004. PATENTED DEC. 31, 1907.
A. L. SHEARS.
DETACHABLE PIPE COUPLING.
APPLICATION FILED APR. 19, 1907.

Witnesses
Inventor
A. L. Shears
By James J. Sheehy
Attorney

UNITED STATES PATENT OFFICE.

ALBERT L. SHEARS, OF SEATTLE, WASHINGTON.

DETACHABLE PIPE-COUPLING.

No. 875,004.   Specification of Letters Patent.   Patented Dec. 31, 1907.

Application filed April 19, 1907. Serial No. 369,088.

*To all whom it may concern:*

Be it known that I, ALBERT L. SHEARS, citizen of the United States, residing at Seattle, in the county of King and State of Washington, have invented new and useful Improvements in Detachable Pipe-Couplings, of which the following is a specification.

My invention pertains to detachable couplings for hose, pipe and the like; and it has for its object to provide a coupling which will permit of two sections of hose or pipe being expeditiously connected together, and this in such manner that there is no liability of the sections being casually disconnected, and while the sections may be readily disconnected at the pleasure of the party using the coupling, yet leakage between the members of the coupling when the same are properly interlocked is absolutely precluded.

With the foregoing in mind the invention will be fully understood from the following description and claim when the same are read in connection with the accompanying drawings, forming part of the specification, in which—

Figure 1:
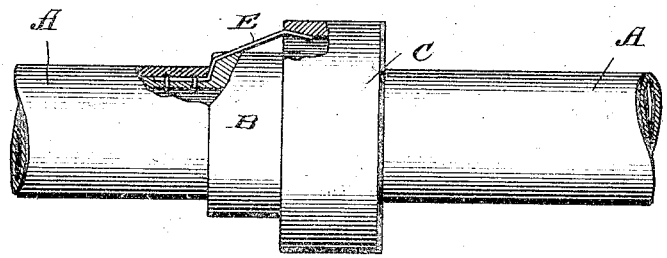
Figure 2:
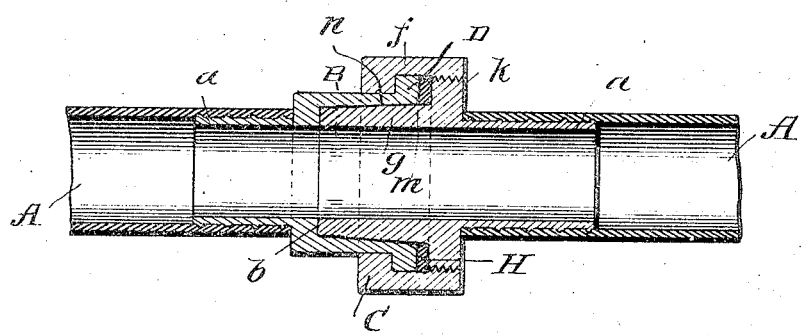
Figure 3:
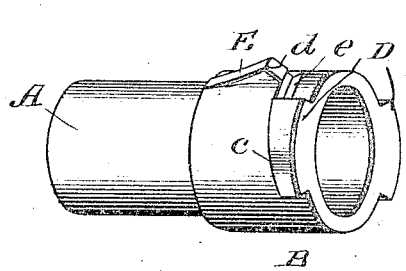
Figure 4:
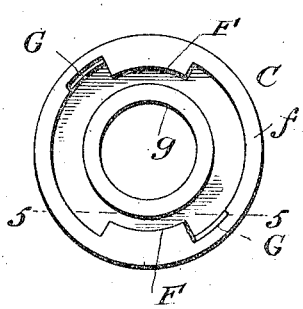
Figure 5:
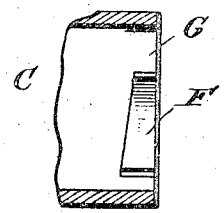

Figure 1 is a side elevation illustrating my novel coupling as properly connecting two sections of hose. Fig. 2 is a longitudinal central section of the same. Fig. 3 is a detail perspective view of the male member of the coupling. Fig. 4 is an elevation of that end of the female coupling member which is opposed to the male member. Fig. 5 is a detail section taken in the plane indicated by the line 5—5 of Fig. 4 and illustrating one of the tapered recesses in the inner side of the female coupling member.

Similar letters designate corresponding parts in all of the views of the drawings, referring to which:

A A are sections of hose.

B is the male member of my novel detachable coupling, and C is the female member thereof. When the said members B and C are employed to effect connection between two sections of hose, the said sections are provided with corrugated tubular shanks *a* which are designed to be arranged in the hose sections and secured in the ordinary manner or any other manner consonant with the purpose of my invention. When, however, my novel coupling members are to be employed to connect sections of pipe they may be formed integral with the pipe sections or may be connected therewith in any suitable way.

As best shown in Fig. 2 the male coupling member B is provided with an interior shoulder or abutment *b*, and exteriorly it is provided at its forward end with diametrically opposite lugs D which extend circumferentially of the member and have their rear sides *c* tapered in a common direction for a purpose presently set forth. The male member B is also provided on its outer side with a longitudinally disposed spring catch E. This spring catch is connected at its rear end to the outer side of the members B, and extends forward and outward from the point of connection and is provided adjacent to its forward end with an apex *d*. In the outer side of said member B and opposite the forward free end of the catch E is a recess *e*, Fig. 3, which is designed to permit full depression of the catch in making or breaking the coupling as will be hereinafter pointed out in detail.

The female coupling member C is larger in diameter than the member B in about the proportion illustrated; and it is provided with a circular peripheral portion *f* and a central tubular portion *g* which latter extends beyond the portion *f* and is designed when the coupling is effected, to bring up against the interior shoulder or abutment *d* of the member B. The female member C is also provided at the inner side of its peripheral portion *f* with diametrically opposite lugs F, the rear sides of which are tapered in a common direction and in a direction opposite to the tapered rear sides of the lugs D on the male member B; and it is further provided in the inner side of the peripheral portion *f* and at points immediately adjacent to the small ends of the lugs F with longitudinal recesses G which are preferably tapered or gradually diminished in depth toward their rear ends as shown. In the innermost portion of its interior and around the central tubular portion *g*, the female member C is provided with a gasket H.

In engaging or interlocking the members B and C of my novel coupling with each other it will be observed that it is simply necessary to move the male member B rectilinearly into the female member C, and then turn the male member through a part of a revolution so as to position the lugs D of member B back of the lugs F of member C. When the male member B is introduced endwise into the member C as described, the forward inwardly inclined portion of the spring catch E will ride under the peripheral portion f of the member C with the result that the said spring catch will be placed under tension. Then when the member B is turned through a part of a revolution and the lugs D are placed back of the lugs F, the spring catch E will reach a position opposite one of the recesses G and will spring outward into the said recess. With the spring catch E in this position, relative to the member C it will be observed that the members B and C are strongly held against turning with respect to each other, and consequently there is no liability of the members being casually disconnected. When, however, it is desired to disconnect the members, the operator has but to press the catch E inward with his thumb so as to enable the said catch to clear the recess G, and then turn the member B backward or toward the left through a part of a revolution or until the lugs D are clear of the lugs F when he may readily withdraw the member B endwise from the member C. In turning the member B toward the right in making the coupling, it will be observed that by virtue of the tapered rear sides of the lugs D being opposed to the tapered rear sides of the lugs F, the forward end of the member B will be crowded against the gasket H and said gasket will be compressed, with the result that the connection will be rendered perfectly water-tight.

By reference to Fig. 2 it will be observed that the central tubular portion g of the member C is exteriorly tapered toward its forward end, as indicated by m, and that portion of the member B in which said portion g is snugly received is correspondingly tapered, as indicated by n. From this it follows that when the coupling is made, the portion g of member C is wedged in the member B, so that the connection between the members is water-tight even when the gasket H is deteriorated.

When desirable the peripheral portion f of the female member C may be threaded on the body portion k of the member, this in order to facilitate the manufacture of the member.

It will be gathered from the foregoing that my coupling is simple and compact in construction, and yet through the medium of the same two sections of hose or pipe may be expeditiously and easily connected and as readily disconnected, and this without liability of leakage when the coupling is made and without liability of the coupling members being casually disconnected.

I have entered into a detailed description of the construction and relative arrangement of the parts comprised in the present and preferred embodiment of my invention in order to impart a definite understanding of said embodiment, but I do not desire to be understood as confining myself to the said specific construction and relative arrangement of parts as such changes or modifications may be made in practice as fairly fall within the scope of my invention as claimed.

Having described my invention, what I claim and desire to secure by Letters-Patent, is:

In a detachable coupling, a male member comprising a tubular portion having an interior abutment, and also having a rearwardly tapered bore extending to said abutment, diametrically opposite lugs extending circumferentially on the outer side of the tubular portion and tapered at their rear sides in a common direction, and a longitudnially disposed spring strip connected to the tubular portion and extending outward and forward from the point of connection and provided with an apex and terminating in a forwardly and inwardly inclined free end portion, in combination with a female member comprising a peripheral portion, lugs arranged at the inner side of the peripheral portion and having inclined rear sides, recesses formed in the inner side of the peripheral portion immediately adjacent to the smaller ends of the lugs, a central tubular portion extending beyond the peripheral portion and exteriorly tapered toward its forward end to snugly occupy the rearwardly tapered bore of the first mentioned member, and a gasket arranged in the peripheral portion and surrounding the central tubular portion at the rear of the latter.

In testimony whereof I have hereunto set my hand in presence of two subscribing witnesses.

ALBERT L. SHEARS.

Witnesses:
J. R. McDONNELL,
H. T. GRANGER.